United States Patent [19]

Terry et al.

[11] Patent Number: 4,747,372
[45] Date of Patent: May 31, 1988

[54] TETHER APPARATUS

[76] Inventors: Michael D. Terry; Jack M. Terry, both of 116 Sixth Ave., Sequim, Wash. 98382

[21] Appl. No.: 836,548
[22] Filed: Mar. 6, 1986
[51] Int. Cl.⁴ .............................................. A01K 1/00
[52] U.S. Cl. .................................... 119/117; 119/120
[58] Field of Search ............... 119/117, 118, 119, 120, 119/121, 122, 124, 29; 254/385; 242/100.2; 248/648, 325, 331, 364

[56] References Cited

U.S. PATENT DOCUMENTS

| | | | |
|---|---|---|---|
| 215,730 | 5/1879 | Fox et al. | 119/117 |
| 1,127,397 | 8/1914 | Boyajian | 248/331 |
| 1,486,120 | 4/1923 | Bayles | 248/648 |
| 2,725,853 | 7/1952 | Nordheim | 242/100.2 |

Primary Examiner—Robert P. Swiatek
Assistant Examiner—R. Thomas Price
Attorney, Agent, or Firm—William I. Beach

[57] ABSTRACT

The animal tether comprises an upright tube connected at an upper end to the end of a lateral tube. The apparatus is rotatably mounted on a base member upstanding shaft. Extending outwardly of the tubes a tether line together with a leash line is attached to an animal. The tether line is further engaged in reciprocal turns of line with a pair of pulley blocks which in response to, and animal movement shortens the distance between blocks. This in turn lifts a weighted body slidably disposed within the tube thereby applying tension on the animal leash line to prevent the leash line from entanglement.

13 Claims, 2 Drawing Sheets

TETHER APPARATUS

FIELD OF THE INVENTION

The present invention relates to animal tether devices, and more particularly to novel tethers that apply constant tension on the leash line and provides adequate range of movement of the animal without tangling the line around the tether device.

DESCRIPTION OF THE PRIOR ART

The leash law governing the control and behavior of pets requires that the animal be secured when exposed to the public. This applies generally to the containment of the animal on residential property where such animal may get loose in some manner. Being tied up presents some problems. A common problem in keeping an animal safely secured is the frequent entanglement of the leash around the tether device. Unless the animal is properly supervised it can be dangerous and the animal may well hurt itself or at best become so entangled as to limit its range of movement.

A novelty search has disclosed several devices intended to provide a safe and secure animal tether. Among these are U.S. Pat. Nos. 1,699,308 to Postings, 1,956,937 to Van Kleek and 3,716,029 to Pillsbury. All virtually disclose a vertical tube or post connected to a horizontal tube. Included, also were a counter weight on the horizontal tube, a swivel and a leash. None as far as it could be determined could prevent the animal from encircling the upright tube or post and entangling the leash.

In light of the above, it is the object of the present invention to provide a tether apparatus that will solve the aforementioned problems. The present invention is an efficient arrangement of cooperative elements and means providing an adequate range of movement for a tethered animal. The animal can travel freely within the radius of the tether post without entanglement of the leash.

SUMMARY OF THE INVENTION

In carrying out the principles of the present invention a tether apparatus has a base including an upstanding shaft. An elongated upright tube is rotatably supported on the top end of the shaft. The upper end of the tube has a portion of the upper sidewall severed for a small first opening therethrough. There is an eyebolt extending outwardly of the lower end portion adjacent to the top end of the shaft. Resting on the shank of the eyebolt a weighted body slidably disposed within the tube has a ring attachment connected to the upper end of the body. Also connected to the ring is a lower pulley block. Mounted on the upright tube upper end is a lateral elongated tube supported by a notched inner end adapted to straddle the upright tube upper end in an enclosing joint. Adjacent to the lateral tube outer end bottom wall is a second opening. In the inner-end is enclosed an upper pulley block. Means are provided to fasten the upper block to the walls of both tubes in communication with the lower block and both openings. The upper and lower pulley blocks are connected by reciprocal turns of a tether line which has a front end extending outwardly of the second opening and a rear end outwardly of the first opening. Included is an additional pulley connected to the front end and the rear end of the tether line. Another line, a leash, is secured at the bottom end to the upright tube eyebolt.

The upper end of the leash is passed through the tether line rear and front end pulleys and then turned downwardly to the collar of an animal. Further means is included responsive to animal movement and adapted to lift the weighted body upon extention of the leash line. This results in cooperative shortening of the tether line reciprocal turns through the spaced pair of pulley blocks and applying tension on the leash line to control the scope of animal movement and prevent entanglement of the tether line.

BRIEF DESCRIPTION OF THE DRAWING

Referring to FIG. 1 it can be seen that the tether apparatus 10 has an upright tube mounted at one end to the end of a lateral tube. The apparatus is rotatably mounted on a base member upstanding shaft. Extending outwardly of the tubes a tether line together with a leash line is attached to an animal. The tether line further is engaged in reciprocal turns of line with a pair of spaced pulley blocks and in response to animal movement shortens the distance between blocks. This in turn lifts a weighted body slidably disposed in the tube thereby applying tension on the animal leash.

Figure 1:
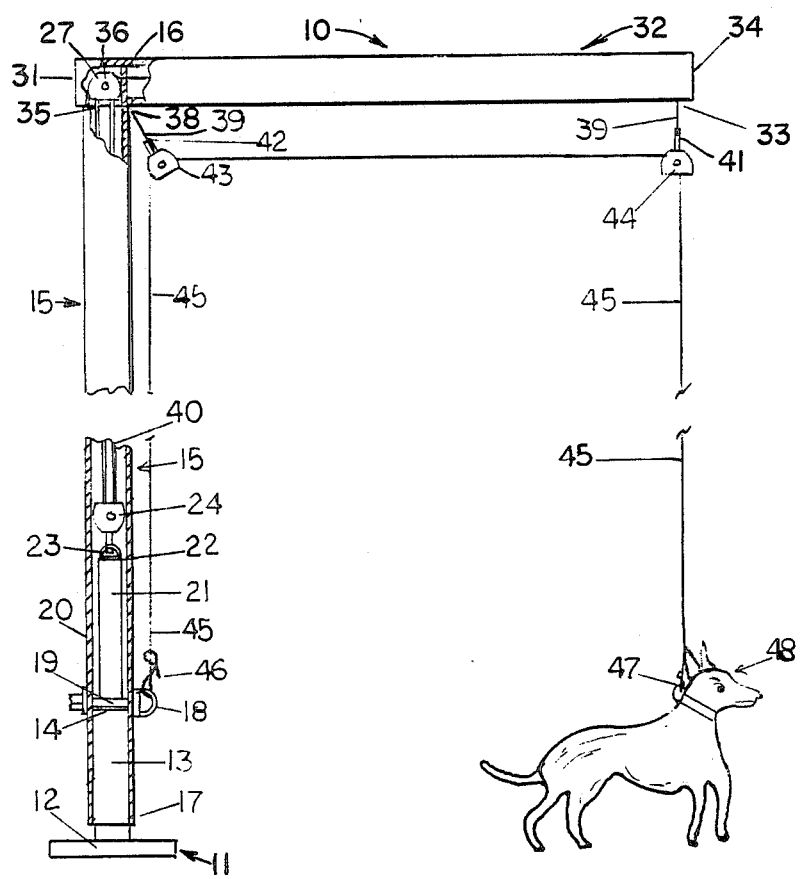
FIG. 1, is an elevated view of an embodiment of the present invention partly in section showing the pulley blocks and the weighted body at rest and the animal standing with virtually zero tension on the leash line.

The tether apparatus 10 has a base member 11 comprising a flat plate 12 and an upstanding shaft 13 centrally mounted on the plate. The shaft has a flat surface top end 14. An elongated upright tube 15 supported on the base member 11 has an upper end 16 and a lower end 17. In a lower end portion of the tube is an eyebolt 18 with a shank 19 extending through the sidewall 20 in intimate contact with the top end 14 which provides a platform for rotation of tube 15 on the base 11. Resting on the other side of the shank is a weighted body 21 slidably disposed within the tube 15. Included on the upper end 22 of the weighted body is a ring attachment 23 to which is connected a lower pulley block 24. Inclosed in the block housing is a pair of spaced wheels 25 and 26 adapted to function as a part of a tackle system with an upper pulley block 27. The upper pulley block also houses three spaced wheels 28, 29 and 30 suspended in upper end 16 of tube 15. The upper end 16 is inclosed by an inner end 31 of a lateral tube 32 which is slightly larger than the upright tube and has a second opening 33 adjacent to an outer end 34. The inner end of tube 32 has a bottom portion of the sidewall 35 removed so as to straddle and enclose the upper end 16 of tube 15. A bolt 36 and nut, not shown, are provided to fasten the upper pulley block 27 within the enclosed area confined by the end juncture of the upright tube and lateral tube. The bolt 36 extends through the pulley block 27 hub together with sidewall 20 and 35 of tube 15 and 32 respectively. A second bolt fastener (not shown) is also used to support the lateral tube. Further, the upright tube has a small opening 38 through the sidewall 20 at the upper end directly under the lateral tube 32.

Figure 4:
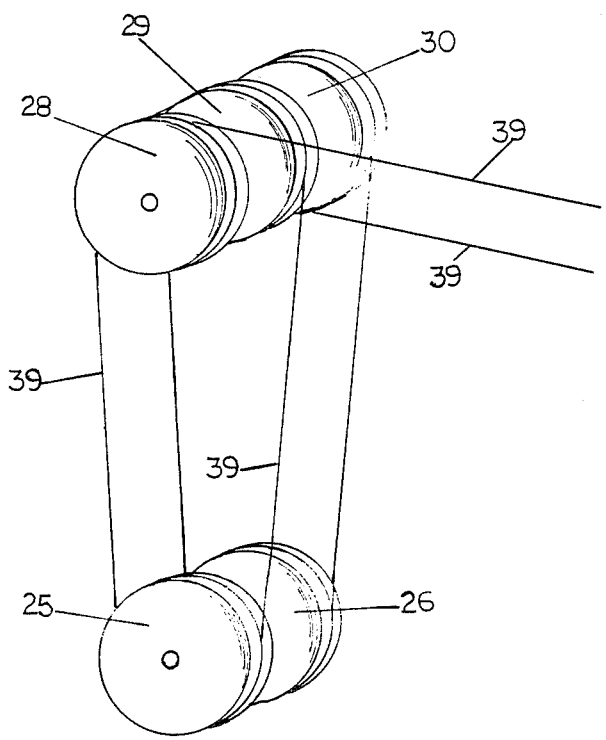
FIG. 4, is a prospective view of the upper and lower pulley blocks engage by reciprocal turns of the pulley line.

Included in apparatus 10 is a tether line 39 which has a portion 40 of the line intermediate of the front end 41 and the rear end 42 wrapped in interchanging links about the upper and lower pulley wheels in forming a tackle system, reference FIG. 4. Subsequently, the rear end 42 portion of the line 40 stretches from upper wheel 28 downwardly to lower wheel 25, up to wheel 29, down to wheel 26, up to wheel 30 and outwardly from the upright tube 14 small opening 38 to a connection with a second single pulley wheel 42. The front end 41 of the tether line extends from upper wheel 28 through the lateral tube 32 and outwardly of the second opening 33 to a first single pulley wheel 44.

Also, included is a leash line 45 connected at a lower end 46 to the upright tube 15 eyebolt 18 and extending upwardly across pulley 43 and 44. From there the leash line upper end 47 extends downwardly to an attachment with an animal 48.

Figure 2:
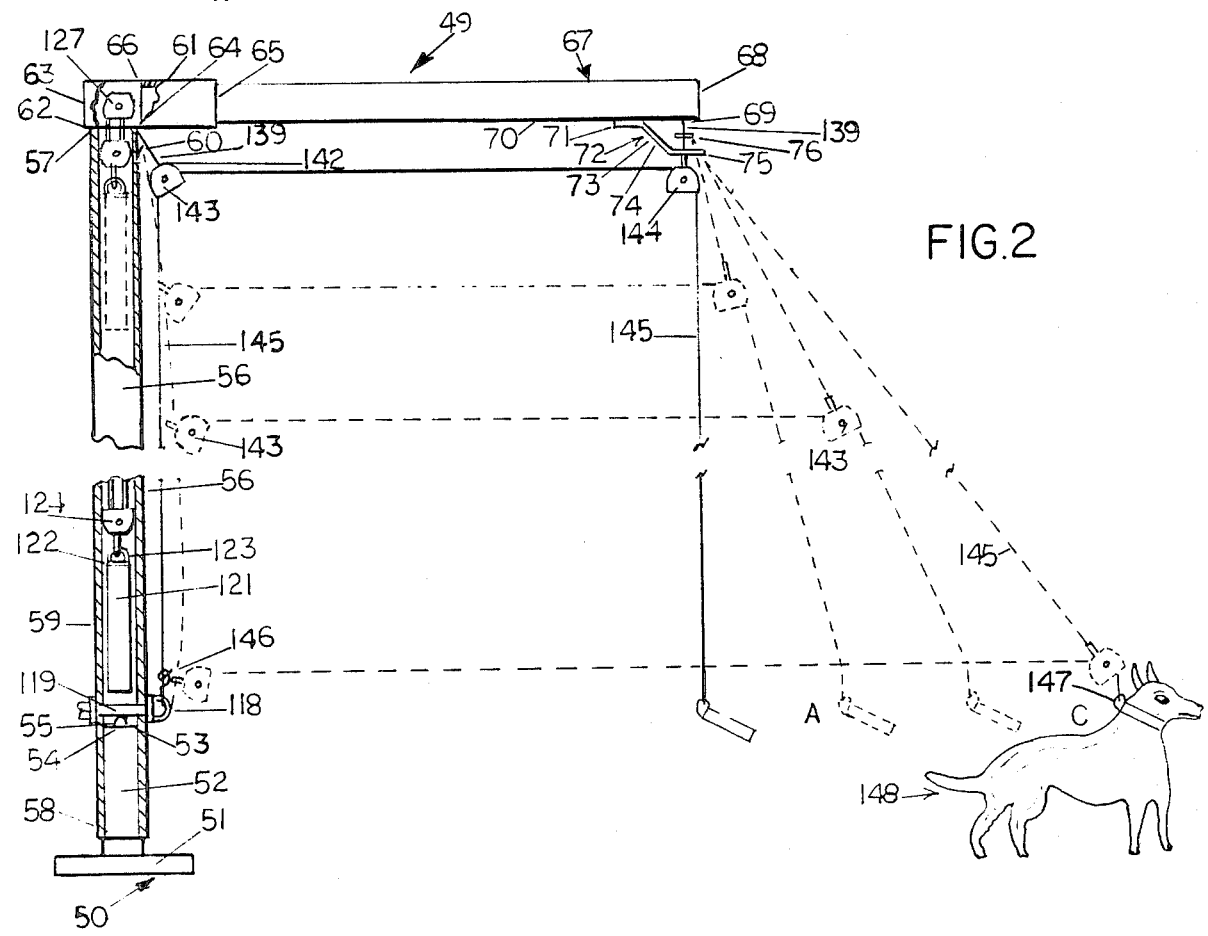
FIG. 2, is an elevated view of a modified form of the present invention partly in section showing the weighted body at the top of its lift due to the full extension of the leash line.

An alternate arrangement or modification is shown in FIG. 2, accordingly in the embodiment of FIG. 2 the elements that are functionally equivalent to elements previously described in connection with FIG. 1 are designated by similar reference numerals each with the prefix 1 added thereto.

Tether apparatus 49 also includes a base member 50 consisting of a flat plate 51, an upstanding round rod 52 secured centrally on the plate and a flat top end 53. Located in the center of the flat top is a shallow cavity 54 which is also holding a hardened sphere 55. Preferably the sphere is uniformally round to facilitate rotation in the cavity with minimum friction. An elongated, vertical square tube 56 with an upper end 57 and lower end 58 has the shank 119 of an eyebolt 118 extending through the sidewall 59 of tube 56. The tube is lowered on the rod 52 so that the shank engages in a point contact with the sphere 55 for virtually frictionless rotation. Further, a weighted square bar 121 including an upper end 122 fastened to a ring attachment 123 is supported on top of the eyebolt shank 119. Connected to the ring attachment 123 is a lower pulley block 124 enclosing spaced wheels 125 and 126 which together with the weighted bar 121 are slidably disposed within tube 56. An upper pulley block 127 enclosing spaced wheels 128, 129 and 130 is suspended in tube 56 upper end 57. In alignment with the upper wheels is an opening 60 sheared from the tube upper end sidewall 59 by severing and bending a strip of the sidewall outwardly to an acute angle with the tube. Connected to the upper end 57 of tube 56 is a short length of similar tubing 61 which has a bottom side 62 partly removed at one end 62 sufficiently to enclose and mount on the upper end 57 of tube 56. A pair of opposite sidewalls 64 of tube 61 is disposed in juxtaposition with a pair of sidewalls 59 of tube 56 and secured together. For example the upper and lower set of edges can be intimately joined by a bonding or welding process. The other end 65 is open and is adapted to receive and support the inner end 66 of a slightly smaller, elongated, horizontal tube 67.

The horizontal tube has an outer end 68 in which there is an opening 69 in the lower sidewall 70 adjacent to the other end. Attached to the sidewall 70 is the upper leg 71 of a stretchedout Z-shaped, guide track 72. The middle leg 73 extends downwardly and forwardly and consists of a pair of narrow spaced rails 74 which spread into a horizontal closed end circle 75 underneath the opening 69.

Extending downwardly from the opening 69 the front end 141 of a tether line 139 is connected to a first single wheel pulley 144. The rear end 142 of the tether line stretches through the horizontal tube 67, in interchanging loops between the three wheels, 128, 129 and 130 of the upper pulley block and downwardly to wheels 125 and 126 of the lower pulley block to form a tackle system, see FIG. 4. On the last turn over wheel 130 of the upper pulley block the rear end 142 of the tether line extends outwardly of the vertical tube upper end opening 60 to a connection with a second single wheel pulley 143. Included between the horizontal tube opening 69 and the closed end circle 75 of guide track 72 is a disk 76 centrally connected to tether line 139. The disk is provided to swing between the pair of rails 74 of the guide track 72 when the animal is turned towards the vertical tube 56 and prevent the length of the tether line 139 attached to the animal from reaching it.

Another line defined as a leash line 145 has a lower end 146 fastened to eyebolt 118 and the upper end 147 passes across single wheel pulley 143 and 144 and then downwardly to an attachment with an animal 148.

One of the major problems with tethers in general is entanglement of the leash. Given sufficient length of line to permit a reasonable range of movement the line frequently piles up in loops of various shapes. The animal gets caught in the loops and is either limited in movement or hurts a leg. Another situation arises where the tether line is tied to a clothes line or to a post. The animal circles the post many times in different directions to cause the line to shorten and restrict its movement.

Figure 3:
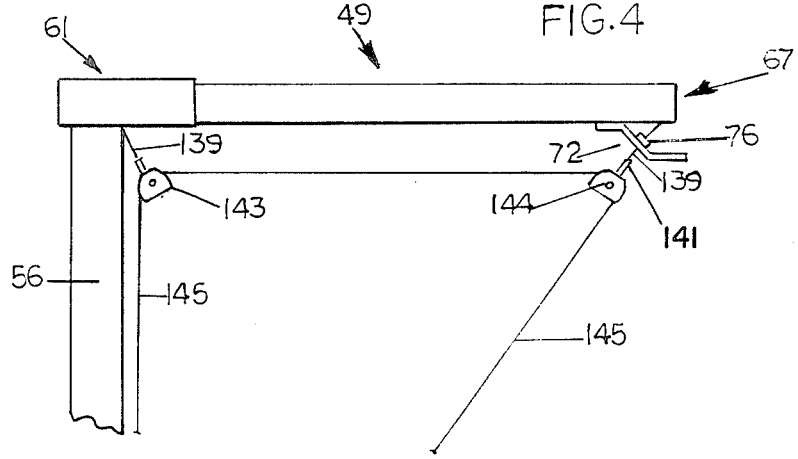
FIG. 3, is an elevated view partly in section of FIG. 2, showing the weighted body in partial lift, the leash line stretched toward the elongated tube and the animal halted before reaching it by the disk lodge in the guide track rails.
Figure 3:
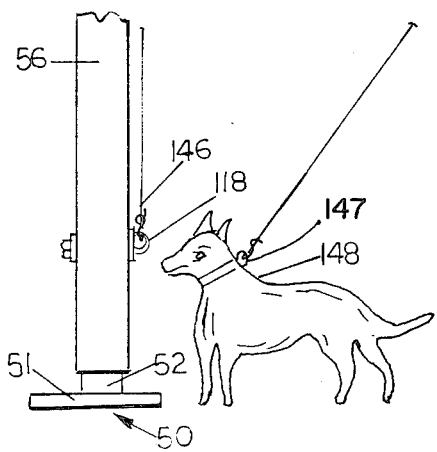

The present invention is designed and equipped to prevent the above and other problems from occuring. FIGS. 2 and 3 illustrates the means used to eliminate the conditions described above. In Fig. 2 the animal is seen moving away from a station of zero tension in the leash line, which is under the outer end of the horizontal tube. The movement of the leash line to some point of distance away from the tether apparatus draws the front end 141 and rear end 142 of the tether line further out of the opening 60 in tube 56 and opening 69 in tube 67 respectively, see FIG. 2. Accordingly, the result of lengthening the tether line outside of the tubes shortens the interchange of line between the upper and lower pulley blocks. The lower block is drawn upwardly toward the upper block thereby lifting the weighted bar 121 off of the eyebolt shank 119. However, if the weight of the bar is too heavy then it restricts being lifted and the animal would not be able to move other than within the close vicinity of the tether apparatus. Therefore, the number of turns exchanged between the upper and lower pulley block determines the rate of tackle lift, the weight of the weighted-bar plus the length of tether and leash lines are arranged to allow adequate freedom of animal movement under proper tension in the leash line.

For example, it can be seen in FIG. 2 that when the animal has reached point A the weight is partially lifted and the tether and leash lines are extended. At point C the animal has reached the allowable distance of movement, the weighted bar is at the top of the vertical tube, the tether line is virtually all out of the tubes and the leash line is horizontally level with the top of the animal. At no point of distance has the leash line fallen to the ground.

In the opposite direction as seen in FIG. 3 the animal is approaching the vertical tube but cannot reach it because the disk between the horizontal tube and the guide track closed end circle will swing into the spaced track rails and prevent the leash line from reaching the vertical tube. Consequently, the animal cannot circle the tube and entangle the leash line.

The base upon which the tether apparatus is rotated can provide a heavy plate so that it can be portable. Nevertheless, it is preferable that the plate be small enough to stand in a sunken weld and secured for a stationary tether apparatus.

From the description and illustration of the present invention, it is obvious that it provides important advantages mentioned in the above discussion.

The aforegoing description is to be clearly understood to be given by way of illustration and example only, the spirit and scope of the present invention being limited solely by the appended claims.

We claim:

1. An animal tether for controlling the range of movement, which comprises:
    a base member including an upstanding shaft mounted thereon and extending upwardly to a top end,
    an elongated upright tube rotatably supported on the top end of the shaft, the tube comprising a lower open end,
    an eyebolt having a shank extending through an upright tube sidewall near the lower end in rotational contact with the shaft top end,
    a weighted body mounted on the shank and including a ring attachment on the body upper end,
    a lower pulley block secured to the ring attachment,
    an elongated lateral tube having a bottom portion of the inner end removed so as to straddle mount on the upright tube upper end and an opening on the bottom side of the lateral tube in proximity to an outer end,
    an upper pulley block disposed in the space enclosed by the upright and lateral tubes,
    means including a bolt and nut fastener for securing the upper pulley block in the enclosed space in communication with the lower pulley block and the lateral tube bottom opening,
    a tether line adapted to engage said pulley blocks with multiple turns and provide a tackle so as to urge said weighted body in reciprocating movement and having a front end extending out of said lateral tube bottom opening to a first pulley connection and a rear end extending out of said upright tube lower open end to a second pulley connection,
    a leash line comprising a bottom end connected to the eyebolt and a forward end passed through the second and first pulley to a collar connection with an animal, and
    means for urging said weighted body into reciprocal movement responsive to animal travel away from or toward said upright tube apply tension on the leash line to prevent said line from becoming entangled on the ground or around the base member.

2. An animal tether as recited in Claim 1, wherein: said upright tube is square in cross-section, and said lateral tube has a square cross-section.

3. An animal tether as recited in Claim 1, wherein: said weighted body is a solid square bar.

4. An animal tether as recited in Claim 1, wherein: said upper pulley block contains three wheels, and said lower pulley has two wheels.

5. An animal tether as recited in Claim 1, wherein: the means for urging said weighted body into reciprocal movement due to tether line tension shortens the interchange of line between pulley block resulting in lifting said weighted body from a position of rest.

6. An animal tether as recited in Claim 1, wherein: said lateral tube further includes a distorted Z-shaped guide which has an upper leg attached to the bottom opening of said lateral tube in proximity to the outer end a forwardly slanting track which spreads horizontally into a closed end loop beneath said lateral tube bottom opening.

7. An animal tether for controlling the range of movement, which comprises:
    a base plate including an upstanding rod mounted thereon having an upper and lower end and a cavity in a top surface of the rod,
    a small round body disposed in the cavity,
    an elongated square vertical tube having the upper end sidewall of the square tube sheared for a side opening and a lower end supported on the base plate,
    an eyebolt including a shank fastened through opposite side walls in the lower end portion of said vertical tube, the shank engaging the top of the round body for rotation of said vertical tube,
    a weighted bar mounted on said shank and including a ring attachment on the top end of the bar,
    a lower pulley block containing two rotatable wheels connected to the ring attachment,
    an upper pulley block containing three rotatable wheels being secured within said vertical tube upper end in communication the lower pulley block,
    means including a bolt and nut fastener for securing the upper pulley block in alignment with said vertical tube side opening,
    a sleeve-like square tube substantially less in length than said vertical tube intimately mounted on said upper end of said vertical tube, the bottom side wall of the rear end portion being removed to provide access to said vertical tube upper end,
    an elongated horizontal tube having a cross-sectional area less than said vertical tube and including an inner end supported within the sleeve-like tube, and a second opening in the bottom surface of an outer end,
    a distorted Z-shaped guide track having an upper leg attached to the bottom of the horizontal tube adjacent to the outer end, a forwardly slanting middle leg divided for a track and a lower leg ring portion extending under the second opening,
    a tether line for providing an interchanging line connection between the upper and said lower pulley blocks to form a tackle arrangement and urge the weighted bar into reciprocating movement by mutual effort of a front end of the line extending outwardly of the second opening to a first pulley connection and the rear end outwardly of the side opening to a second pulley connection,
    a leash line having a lower end connected to the eyebolt and a forward end extending through the second and first pulleys and downwardly to a connection to an animal, means associated with animal movement for urging the tackle arrangement to raise said weighted bar and apply sufficient tension on the leash line to prevent entanglement on the ground or around said vertical tube.

8. An animal tether as recited in claim 7, wherein: said round body is a sphere.

9. An animal tether as recited in claim 7, wherein: said side opening is provided by a flap of sidewall bent downwardly and outwardly.

10. An animal tether as recited in claim 7, wherein: said shank has a line contact with the sphere.

11. An animal tether as recited in claim 7, wherein: the means associated with animal movement to prevent entanglement of said leash line causes said tackle to lessen distance between pulley blocks and raise said weighted bar thereby keeping said leash line taunt through out movement of said animal.

12. An animal tether as recited in claim 7, wherein: the small disk prevents said leash line entanglement around said vertical tube by slipping into said guide track and stopping the animal's approach to said vertical tube by limiting the length of said leash line short of the distance to said vertical tube.

13. An animal tether as recited in claim 7, wherein: said tether line includes a small disk connected to said tether line between said second opening and the lower leg ring portion of the guide track.

* * * * *